United States Patent
Todd et al.

(10) Patent No.: US 12,518,231 B2
(45) Date of Patent: Jan. 6, 2026

(54) METADATA-BASED LEARNING CURRICULUM GENERATION

(71) Applicant: Dell Products L.P., Round Rock, TX (US)

(72) Inventors: Stephen James Todd, North Andover, MA (US); Eloy Francisco Macha, Crowley, TX (US); David Edward Frattura, Stamford, CT (US); Robert Anthony Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 414 days.

(21) Appl. No.: 18/162,373

(22) Filed: Jan. 31, 2023

(65) Prior Publication Data

US 2024/0257015 A1  Aug. 1, 2024

(51) Int. Cl.
| | | |
|---|---|---|
| *G06F 16/00* | (2019.01) | |
| *G06F 16/335* | (2019.01) | |
| *G06F 16/901* | (2019.01) | |
| *G06F 16/9035* | (2019.01) | |
| *G06Q 10/0637* | (2023.01) | |

(52) U.S. Cl.
CPC ....... *G06Q 10/0637* (2013.01); *G06F 16/337* (2019.01); *G06F 16/9024* (2019.01); *G06F 16/9035* (2019.01)

(58) Field of Classification Search
CPC .................................................. G06F 16/337
See application file for complete search history.

(56) References Cited

U.S. PATENT DOCUMENTS

| | | |
|---|---|---|
| 7,512,612 B1 | 3/2009 | Akella et al. |
| 7,805,440 B2 | 9/2010 | Farrell et al. |
| 11,947,598 B2 | 4/2024 | Zhou et al. |
| 2012/0096002 A1 | 4/2012 | Sheehan et al. |
| 2014/0223467 A1 | 8/2014 | Hayton et al. |
| 2015/0356431 A1 | 12/2015 | Saxena et al. |

(Continued)

OTHER PUBLICATIONS

Totet, Matthieu, K-partite and Bipartite Graph (Multimode Networks Transformations), K-partite and Bipartite Graph (Multimode Networks Transformations), Unknown, pp. 1-8, 2021.

*Primary Examiner* — Ajith Jacob
(74) *Attorney, Agent, or Firm* — Chamberlain, Hrdlicka, White, Williams & Aughtry; Aly Z. Dossa

(57) ABSTRACT

A method and system for metadata-based learning curriculum generation. A learning curriculum may generally refer to an ordered (or sequenced) manifest of learning materials and/or content that may progressively advance user proficiency in at least a learning topic of interest. Existing systems or solutions offering learning curriculums today rely on the availability of static assets supported by static metadata descriptive thereof. As an improvement over said existing systems/solutions, embodiments disclosed herein enable newly introduced and ingested information, from across various data sources, to dynamically update the metadata and, therefore, dynamically update any learning curriculum(s) contingent on said metadata. Moreover, accessibility or inaccessibility to any given asset (e.g., learning material and/or content) may depend on the access authority granted to the user(s) seeking said given asset.

14 Claims, 18 Drawing Sheets

(56) References Cited

U.S. PATENT DOCUMENTS

| | | |
|---|---|---|
| 2016/0269328 A1 | 9/2016 | Pola |
| 2017/0316098 A1 | 11/2017 | Meyerzon et al. |
| 2017/0371881 A1 | 12/2017 | Reynolds et al. |
| 2018/0324976 A1 | 11/2018 | Gao et al. |
| 2019/0050874 A1 | 2/2019 | Matlick et al. |
| 2020/0382586 A1* | 12/2020 | Badawy .............. G06F 16/9024 |
| 2021/0304044 A1 | 9/2021 | Nagarajan et al. |
| 2022/0188698 A1 | 6/2022 | Halecky et al. |
| 2022/0361376 A1 | 11/2022 | Gao |
| 2023/0353651 A1 | 11/2023 | Maurer et al. |
| 2023/0376496 A1 | 11/2023 | Jacob et al. |
| 2024/0138106 A1 | 4/2024 | Duncan et al. |

\* cited by examiner

METADATA-BASED LEARNING CURRICULUM GENERATION

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for creating learning curriculums. The method includes: receiving a learning query including a learning topic; obtaining a metadata graph representative of an asset catalog; filtering, based on the learning topic, the metadata graph to identify a node subset; generating a k-partite metadata graph using the node subset; and creating a learning curriculum based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for creating learning curriculums. The method includes: receiving a learning query including a learning topic; obtaining a metadata graph representative of an asset catalog; filtering, based on the learning topic, the metadata graph to identify a node subset; generating a k-partite metadata graph using the node subset; and creating a learning curriculum based on the k-partite metadata graph.

In general, in one aspect, embodiments disclosed herein relate to a system. The system includes: a client device; and an insight service operatively connected to the client device, and including a computer processor configured to perform a method for creating learning curriculums. The method includes: receiving, from the client device, a learning query including a learning topic; obtaining a metadata graph representative of an asset catalog; filtering, based on the learning topic, the metadata graph to identify a node subset; generating a k-partite metadata graph using the node subset; and creating a learning curriculum based on the k-partite metadata graph.

Other aspects disclosed herein will be apparent from the following description and the appended claims.

DETAILED DESCRIPTION

Figure 1A:
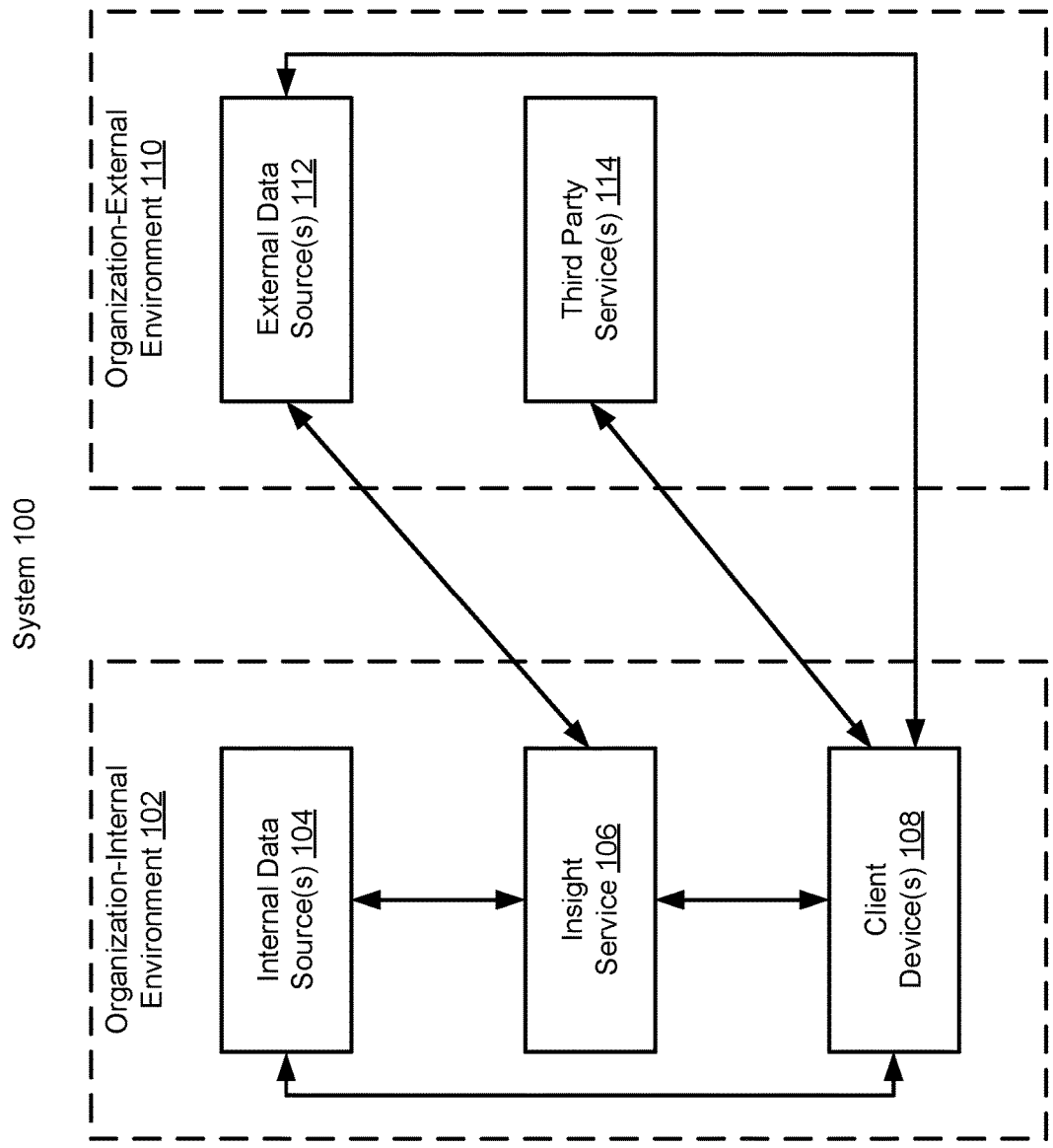
FIG. 1A shows a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5I, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to metadata-based learning curriculum generation. A learning curriculum may generally refer to an ordered (or sequenced) manifest of learning materials and/or content that may progressively advance user proficiency in at least a learning topic of interest. Existing systems or solutions offering learning curriculums today rely on the availability of static assets supported by static metadata descriptive thereof. As an improvement over said existing systems/solutions, embodiments disclosed herein enable newly introduced and ingested information, from across various data sources, to dynamically update the metadata and, therefore, dynamically update any learning curriculum(s) contingent on said metadata. Moreover, accessibility or inaccessibility to any given asset (e.g., learning material and/or content) may depend on the access authority granted to the user(s) seeking said given asset.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: metadata-based learning curriculum generation, as described in FIGS. 3A and 3B as well as exemplified in FIGS. 5A-5I, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
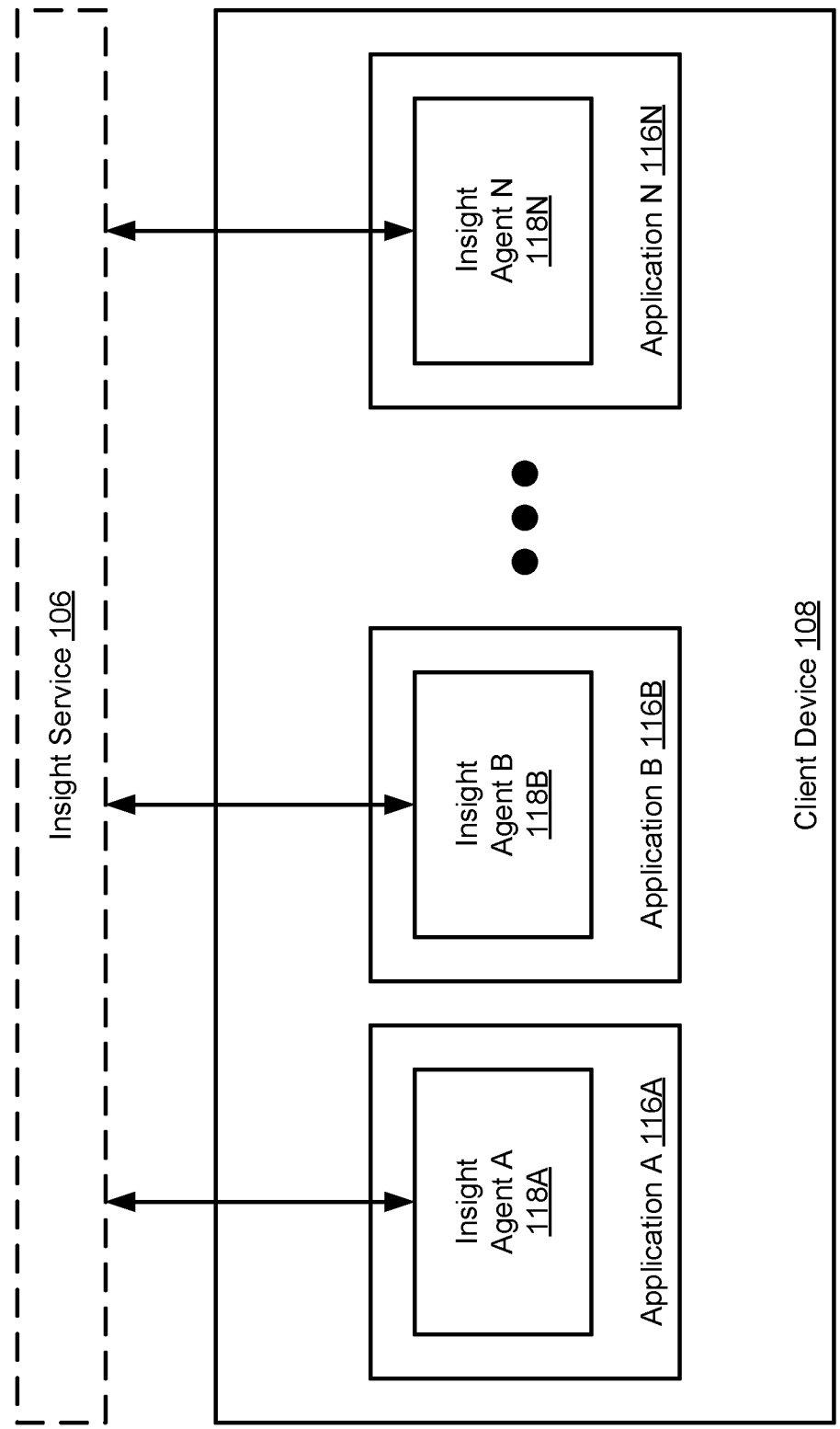
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
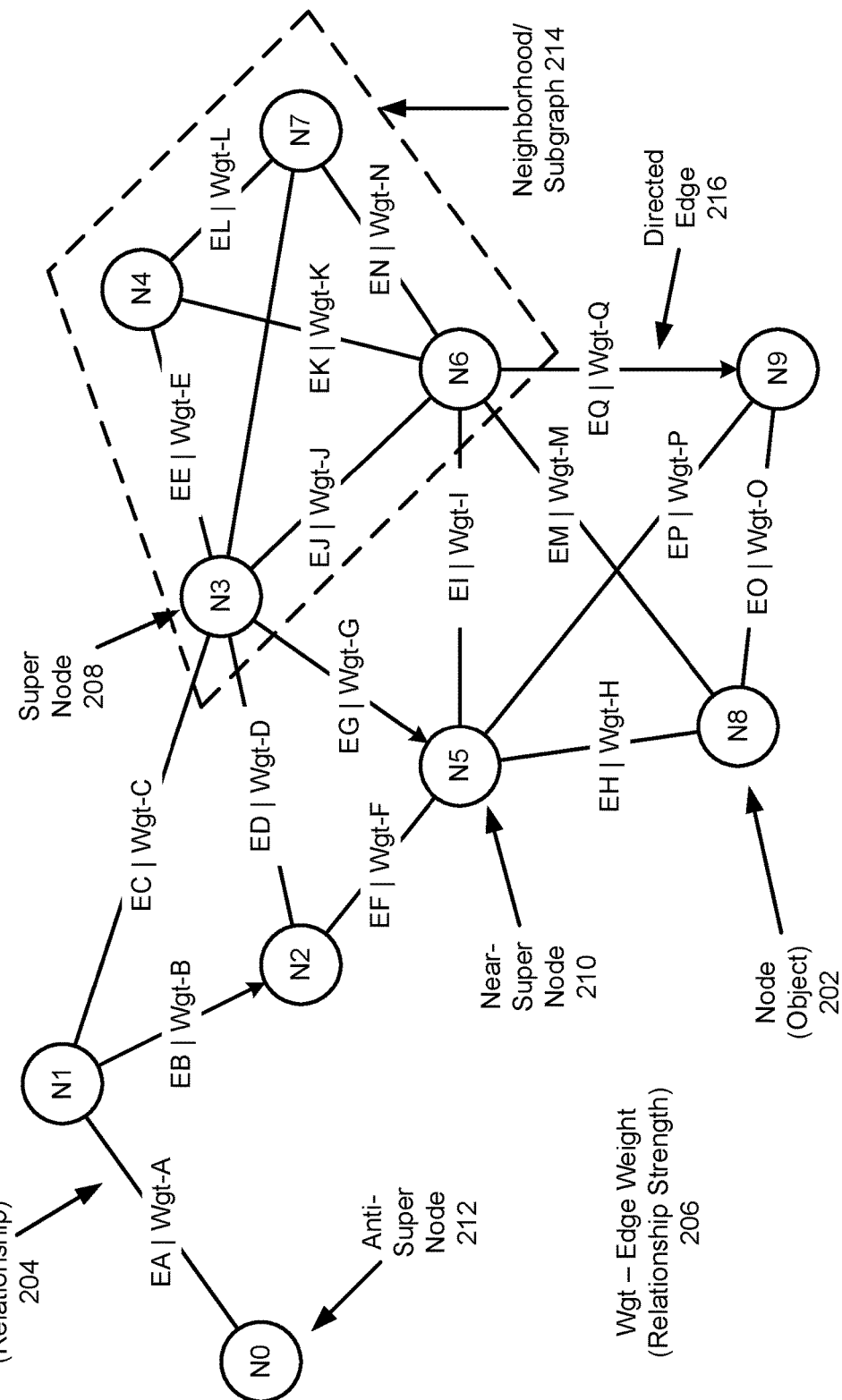
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, ..., N9) interconnected by a set of edges (204, 216) (denoted in the example by the lines labeled EA, EB, EC, ..., EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, ..., Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
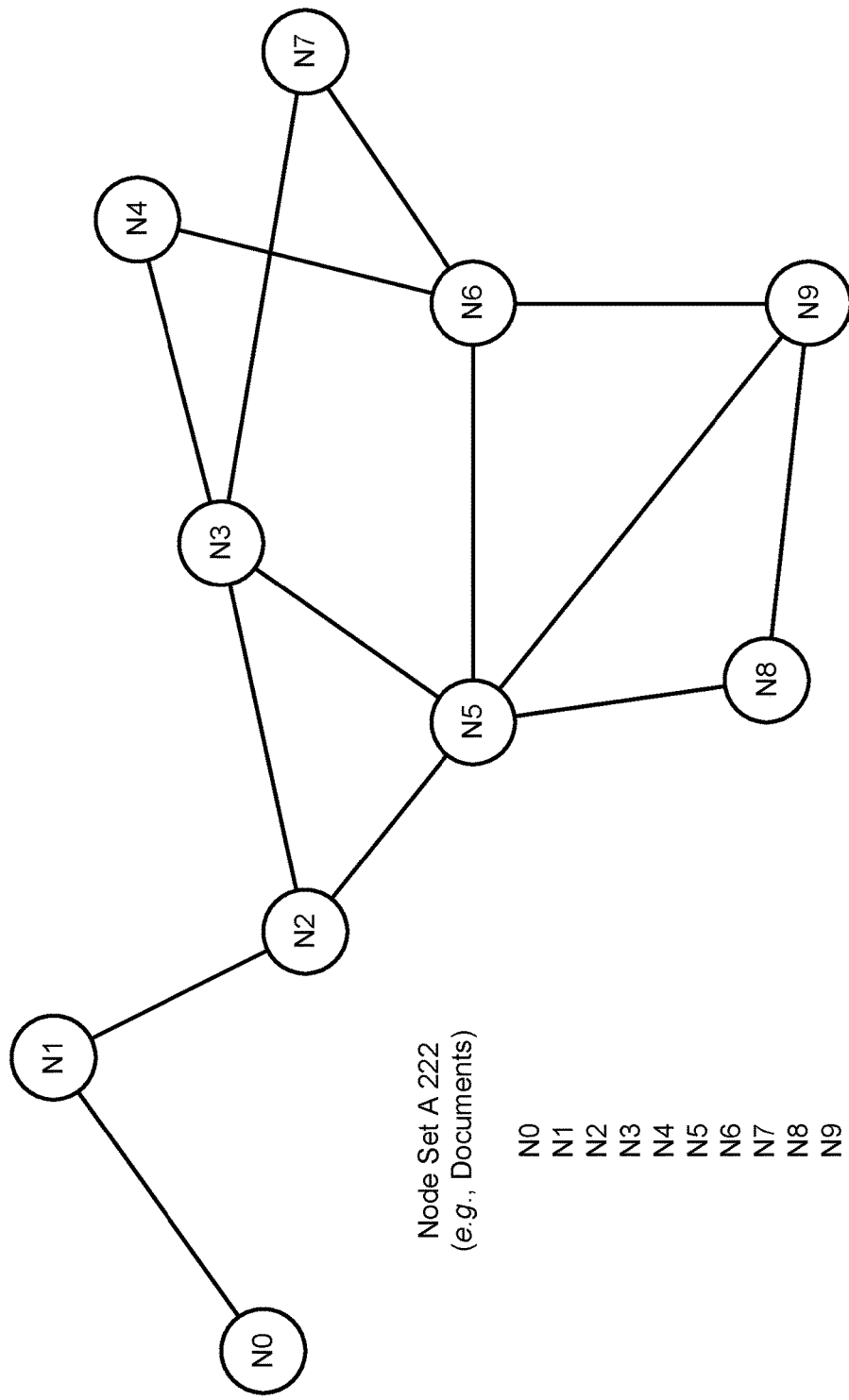
FIGS. 2B-2D show example k-partite connected graphs in accordance with one or more embodiments disclosed herein.
Figure 2C:
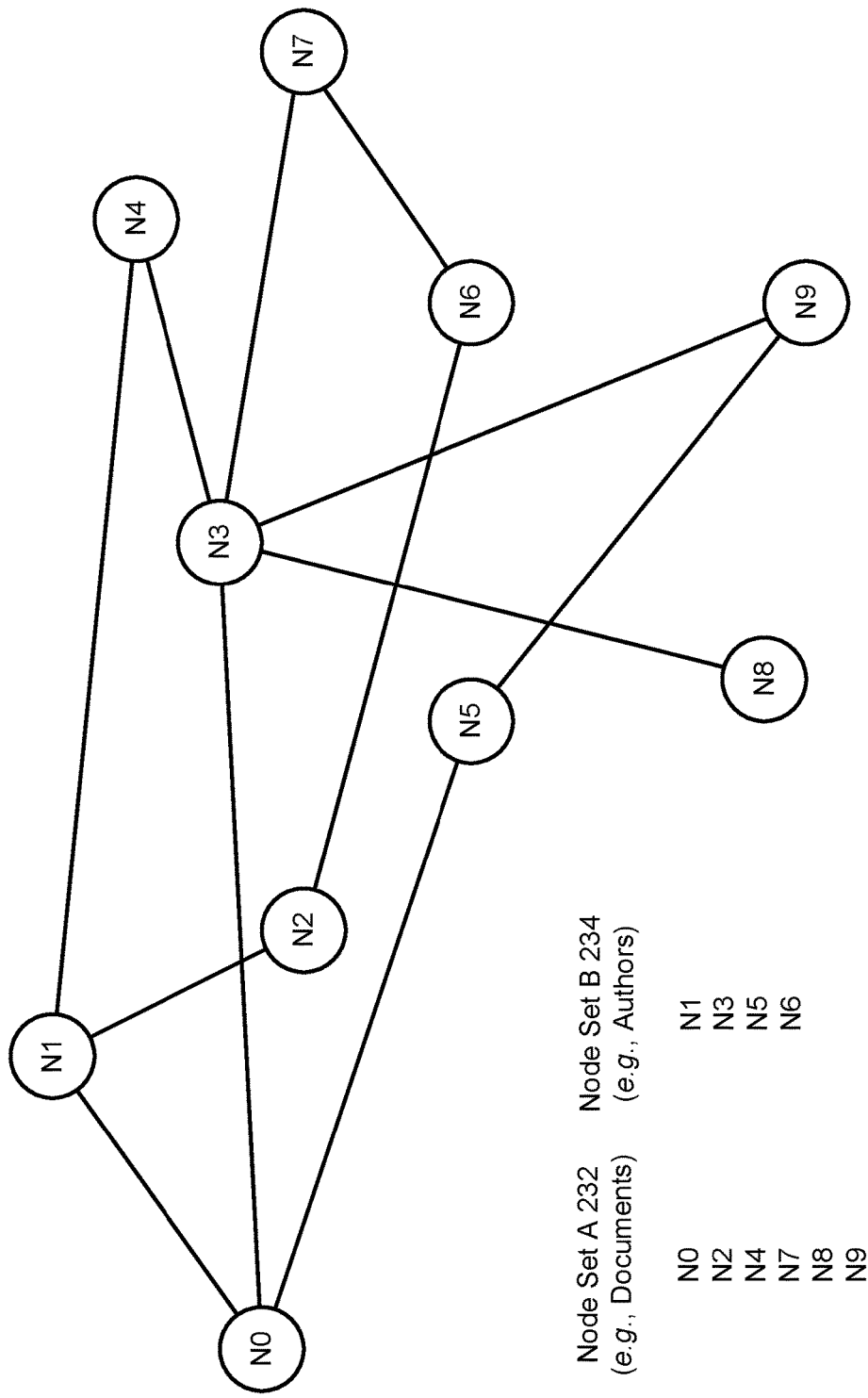
Figure 2D:
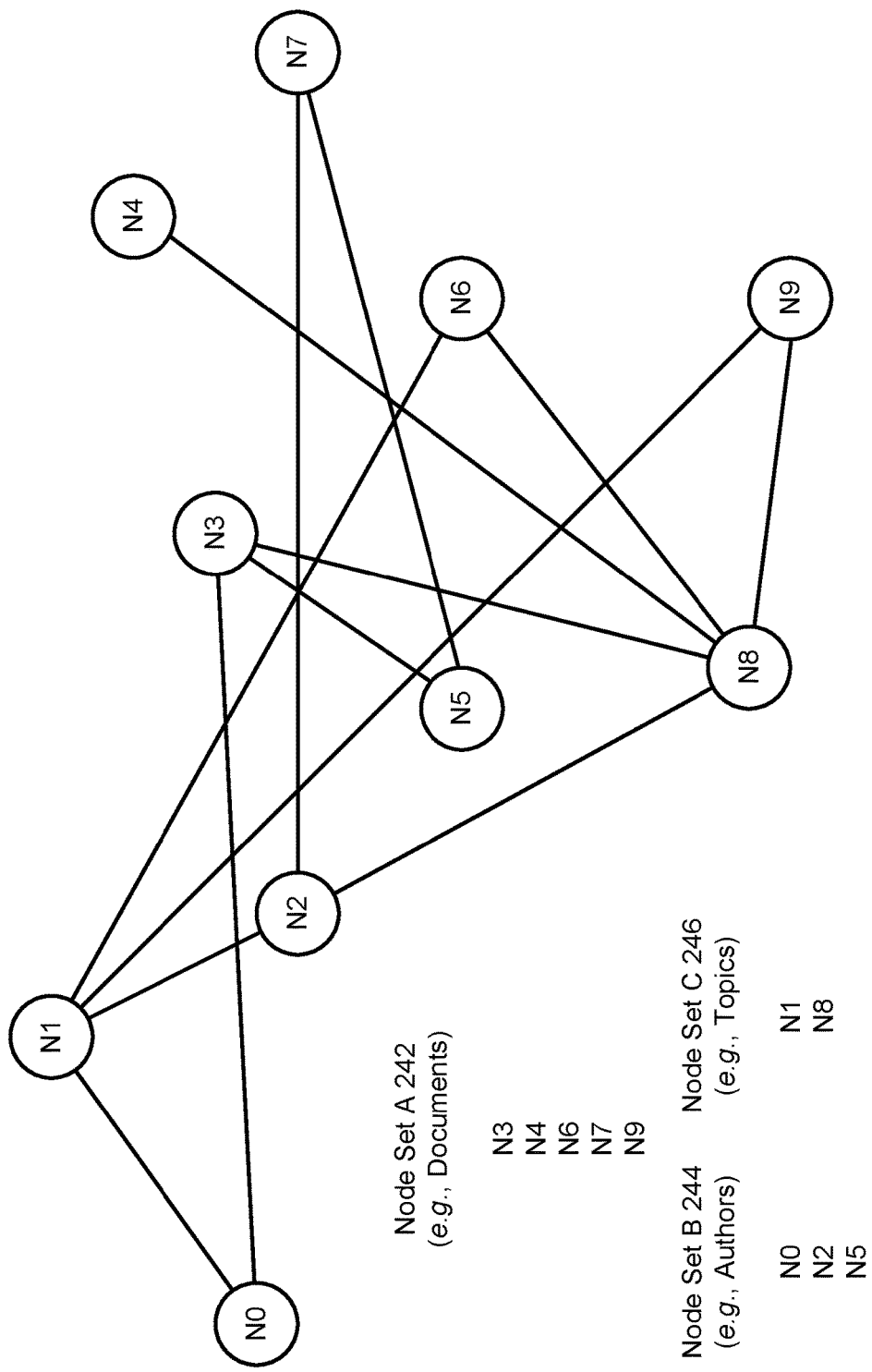

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, ..., N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3A:
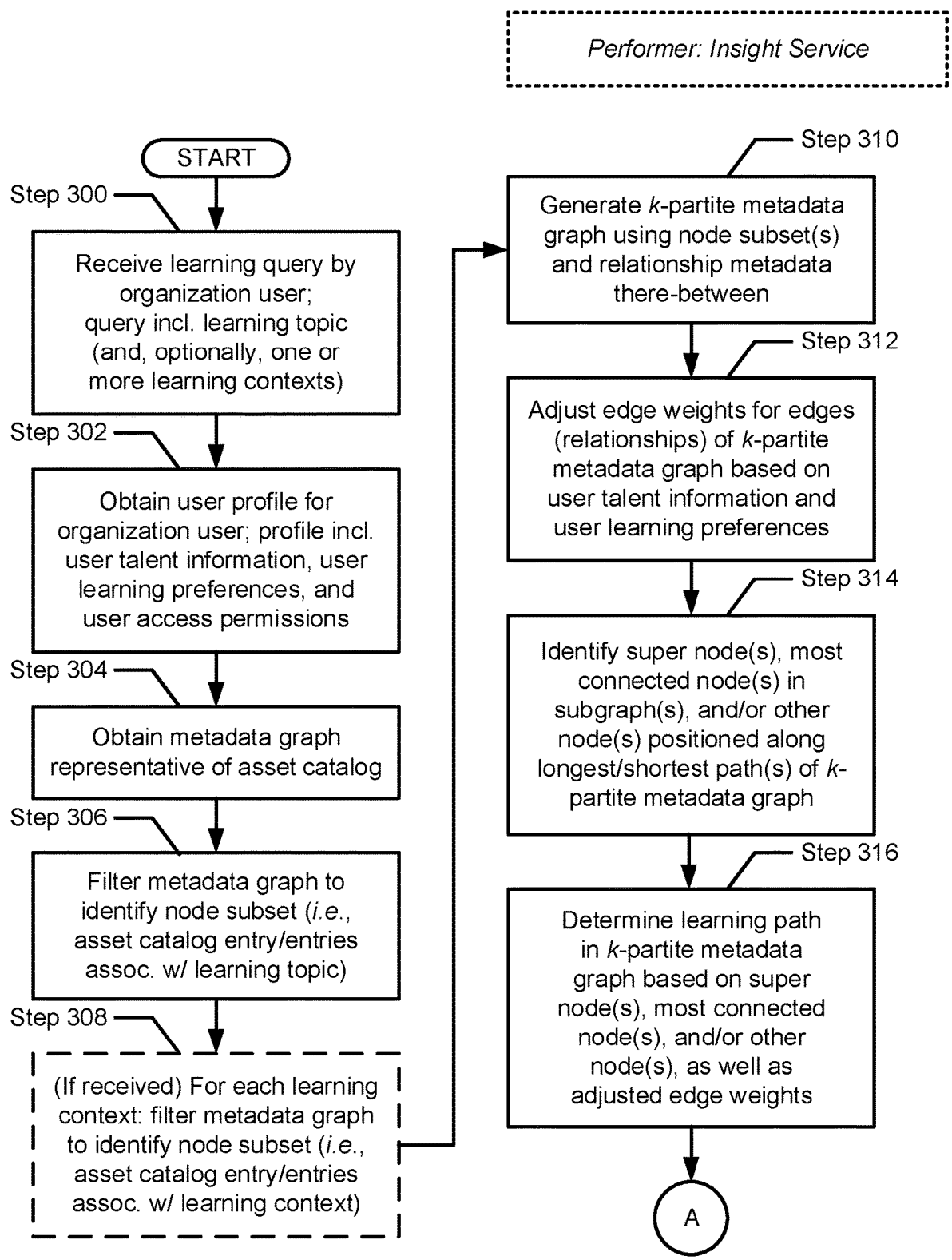
FIGS. 3A and 3B show flowcharts describing a method for metadata-based learning curriculum generation in accordance with one or more embodiments disclosed herein.
Figure 3B:
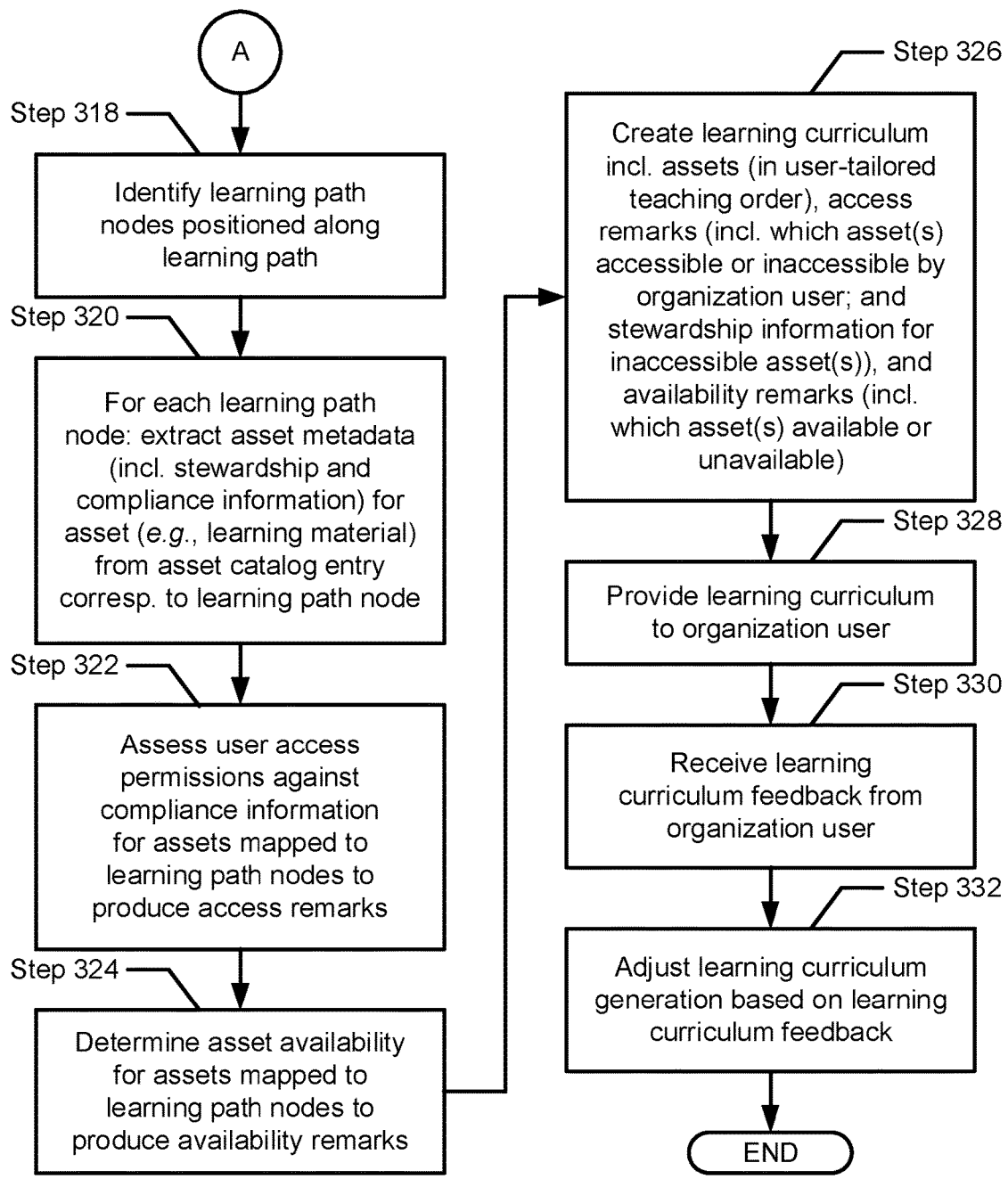

FIGS. 3A-3C show flowcharts describing a method for dynamic data product creation in accordance with one or more embodiments disclosed herein. The various steps outlined below may be performed by an insight service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

FIGS. 3A and 3B show flowcharts describing a method for metadata-based learning curriculum generation in accordance with one or more embodiments disclosed herein. The various steps outlined below may be performed by an insight service (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a learning query is received. In one or many embodiment(s) disclosed herein, the learning query may include or specify a learning topic and, optionally, one or more learning contexts. A learning topic may refer to subject matter about which new information, knowledge, and/or skills is sought to be acquired, whereas a learning context may refer to a domain or setting within which the learning topic may be constrained. Further, the learning query may have been submitted by an organization user. As such, the learning query may represent an inquiry, by the organization user, with regards to the selection of known or available materials, as well as the ordered introduction thereof, through which subject matter proficiency may be attained.

In Step 302, a user profile is obtained. In one or many embodiment(s) disclosed herein, the user profile may pertain to the organization user (from which the learning query had been received in Step 300). The user profile may refer to a collection of settings and information associated with the organization user. As such, the user profile may include, but is not limited to, user talent information, user learning preferences, and user access permissions.

In one or many embodiment(s) disclosed herein, the user talent information may reflect a compilation of talent- and development-related details associated with the organization user. Examples of said details may include, but are not limited to: an education level (e.g., degree(s) in which domain(s), as well as which tier(s) of degree(s)) earned by the organization user; any professional certification(s) gained by the organization user; one or more competencies (as well as their respective level(s) and/or potential(s)) characterizing the organization user; and any business- or research-related interest(s) (as well as their respective proficiency/proficiencies) expressed by the organization user. The compiled details defining the user talent information for any given organization user are not limited to the aforementioned specific examples.

In one or many embodiment(s) disclosed herein, the user learning preferences may reflect one or more educational modalities that the organization user may favor over others in order to optimize learning topic comprehension and retention. Said educational modality/modalities may include, but is/are not limited to, visual learning (i.e., learning assisted through images, videos, animations, and/or multimedia), auditory learning (i.e., learning assisted through audio), and reading learning (i.e., learning assisted through text-based content).

In one or many embodiment(s) disclosed herein, the user access permissions may reflect the level of authorization granted to the organization user for accessing specific resources. The granted level of authorization, for any given organization user, may, for example, be contingent on any number of factors, which may include, but is/are not limited to: one or more user organization roles (e.g., title(s) and/or position(s)) within an organization that may be associated with the given organization user; one or more organization responsibilities (e.g., assigned project(s) or task(s)) within an organization that may be associated with the given organization user; a client device (and the security hygiene or characteristics thereof) operated by the given organization user; and a geographical location where the given organization user may be physically situated. The factor(s) affecting the user access permissions for any given organization user is/are not limited to the aforementioned specific examples.

In Step 304, a metadata graph is obtained. In one or many embodiment(s) disclosed herein, the metadata graph may refer to a connected graph (see e.g., FIG. 2A) representative of an asset catalog. To that end, the metadata graph may include a set of nodes interconnected by a set of edges, where the set of nodes are representative of asset catalog entries and the set of edges are representative of connections or relationships there-between. Further, each node may pertain to a given asset (e.g., a text document, multimedia, a presentation deck, an audio book or podcast, or any other forms of digital learning materials), where the representative asset catalog entry thereof may store metadata for, or information descriptive of, the given asset.

Examples of said asset metadata may include, but is not limited to: a brief description of the asset; stewardship (or ownership) information (e.g., individual or group name(s), contact information, etc.) pertaining to the steward(s)/owner(s) of the asset; a version character string reflective of a version or state of the asset at/for a given point-in-time; one or more categories, topics, and/or aspects associated with the asset; an asset identifier uniquely identifying the asset; one or more tags, keywords, or terms further describing the asset; a source identifier and/or location associated with an internal or external data source (see e.g., FIG. 1A) where the asset resides or is maintained; and compliance information specifying laws, regulations, and standards surrounding the asset, as well as policies directed to data governance (e.g., availability, usability, integrity, and security) pertinent to the asset. The asset metadata for any asset is not limited to the aforementioned specific examples.

In Step 306, the metadata graph (obtained in Step 304) is filtered based on the learning topic (received via the learning query in Step 300). In one or many embodiment(s) disclosed herein, filtering of the metadata graph may, for example, entail topic matching (e.g., case-insensitive word or phrase matching) between the learning topic and the asset metadata for assets catalogued in the asset catalog entries of which nodes of the metadata graph are representative. Further, filtering of the metadata graph based on the learning topic may result in the identification of a node subset of the set of nodes forming the metadata graph. The identified node subset, subsequently, may include one or more nodes representative of one or more assets, respectively, that may be associated with the learning topic.

Hereinafter, in one or many embodiment(s) disclosed herein, if at least one learning context is received via the learning query in Step 300, then the method proceeds to Step 308. On the other hand, in one or many other embodiment(s) disclosed herein, if zero learning contexts are received via the learning query in Step 300, then Step 308 is skipped and, alternatively, the method proceeds to Step 310.

In Step 308, for each learning context of the learning context(s) (if any) (received via the learning query in Step 300), the metadata graph (obtained in Step 404) is filtered based on the learning context. In one or many embodiment(s) disclosed herein, filtering of the metadata graph may, for example, entail topic matching (e.g., case-insensitive word or phrase matching) between a given learning context and the asset metadata for assets catalogued in the asset catalog entries of which nodes of the metadata graph are representative. Further, for each learning context, the filtering of the metadata graph based thereon may result in the identification of a node subset of the set of nodes forming the metadata graph. The identified node subset, subsequently, may include one or more nodes representative of one or more assets, respectively, that may be associated with the learning context.

In Step 310, a k-partite metadata graph is generated using the node subset(s) (identified in Step 406 and, optionally, in Step 308). In one or many embodiment(s) disclosed herein, the k-partite metadata graph (see e.g., FIGS. 2B-2D) may reflect a new representation of, which may be based on one or more particular perspectives on, the metadata graph (obtained in Step 404). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)—with the exception of uni- (k=1) partite metadata graphs (see e.g., FIG. 2B) where the set of edges interconnect nodes of the single independent set of nodes (or single node subset) forming the uni-partite metadata graphs.

In Step 312, one or more edge weights (e.g., each expressed as a numerical value) is/are set or adjusted. In one or many embodiment(s) disclosed herein, the set/adjusted edge weight(s) may be assigned to or associated with one or more edges, respectively, in/of the k-partite metadata graph (generated in Step 310). The affected edge(s), specifically, may represent a relationship or relationships between a pair or pairs of assets (e.g., text documents, multimedia, presentation decks, audio books or podcasts, or any other forms of digital learning materials) relevant or related to the learning topic (and, optionally, the learning context(s)) (received via the learning query in Step 300).

Further, in one or many embodiment(s) disclosed herein, the edge weight for any affected edge(s) may be set/adjusted based on the user talent information and/or the user learning preferences (either or both obtained in Step 302). By way of an example, any edge(s) connecting nodes, representative of assets of a format (e.g., text, video, audio, multimedia, image, etc.) matching the educational modality/modalities favored by the organization user and/or representative of assets likened to the talent- and/or development-related details describing the organization user, may have their respective edge weight(s) set/adjusted to a high(er) value in comparison to other edge(s) (e.g., edge(s) connecting nodes alternatively representative of assets of a format mismatching the educational modality/modalities favored by the organization user and/or representative of assets opposing the talent- and/or development-related details describing the organization user) in/of the k-partite metadata graph. The high(er) edge weight value may reflect a strong(er) relationship between any affected pair of nodes, and thus also the corresponding assets, where any strong(er) relationship(s) may be considered in the determination of a learning path (described below) (see e.g., Step 316) tailored to the organization user.

Additionally, or alternatively, the edge weight(s) assigned to, or associated with, the above-mentioned other edge(s) (e.g., edge(s) connecting nodes alternatively representative of assets of a format (e.g., text, video, audio, multimedia, image, etc.) mismatching the educational modality/modalities favored by the organization user and/or representative of assets opposing the talent- and/or development-related details describing the organization user) in/of the k-partite metadata graph may be set/adjusted to a low(er) value in comparison to any edge(s) connecting nodes, representative of assets of a format matching the educational modality/modalities favored by the organization user and/or representative of assets likened to the talent- and/or development-related details describing the organization user. The low(er) edge weight value may reflect a weak(er) relationship between any affected pair of nodes, and thus also the corresponding assets, where any weak(er) relationship(s) may be disregarded in the determination of a learning path tailored to the organization user.

In Step 314, one or more super nodes, in/of the k-partite metadata graph (generated in Step 310), is/are identified. In one or many embodiment(s) disclosed herein, a super node may refer to a densely connected node or a node with a disproportionately high number of edges connected thereto. Additionally, or alternatively, a super node may be identified as any node representing a most connected node (e.g., any node that serves as an endpoint of a pair of endpoints to a highest number of edges) in the k-partite metadata graph, which may otherwise be defined as any node that serves as an endpoint of a pair of endpoints to a number of edges, where the number of edges meets or exceeds a threshold number of edges (that may be dynamically set). For example, the threshold number of edges may be set to ten edges, where any node(s) in the k-partite metadata graph that serves as an endpoint (of a pair of endpoints) to at least ten edges may be classified or labeled as a super node in/of the k-partite metadata graph.

Additionally, or alternatively, one or more most connected nodes, within one or more metadata subgraphs in/of the k-partite metadata graph (generated in Step 310), is/are identified. In one or many embodiment(s) disclosed herein, a metadata subgraph may generally refer to a connected graph that may be found within, and therefore may include at least a portion of the elements (e.g., a set of nodes interconnected by a set of edges) forming, a larger connected graph (e.g., the k-partite metadata graph). A most connected node within any metadata subgraph, accordingly, may be defined as any node found within the metadata subgraph that serves as an endpoint of a pair of endpoints to a second number of edges, where the second number of edges meets or exceeds a second threshold of edges (that may be dynamically set). For example, the second threshold of edges may be set to ten edges, where any node(s) found within any given metadata subgraph(s), in the k-partite metadata graph, that serves as an endpoint (of a pair of endpoints) to at least ten edges may be classified or labeled as a most connected node in/of the given metadata subgraph.

Additionally, or alternatively, one or more other nodes, which may be found in the k-partite metadata graph (generated in Step 310), is/are identified. In one or many embodiment(s) disclosed herein, the other node(s) may be identified based on the satisfaction of one or more other criteria. Examples of said criteria may include, but is not limited to: whether a node is positioned along a longest path traversing the k-partite metadata graph; and whether a node is positioned along a shortest path traversing the k-partite metadata graph.

In Step 316, a learning path, traversing through at least a portion of the k-partite metadata graph (generated in Step 310), is determined. In one or many embodiment(s) disclosed herein, the learning path may refer to a sequence of one or more edges (also referred to herein as learning path edge(s)), which interconnect(s) a sequence of two or more nodes (also referred to herein as learning path nodes), in/of the k-partite metadata graph. The learning path nodes, accordingly, may include: a path-starting node representing the first node in the sequence of nodes; a path-ending node representing the last node in the sequence of nodes; and zero or more path-body nodes respectively representing zero or more intermediate nodes collectively connecting the path-starting node to the path-ending node.

In one or many embodiment(s) disclosed herein, in forming at least a portion of the k-partite metadata graph, each learning path node in/of (i.e., positioned along) the learning path may correspond to an asset catalog entry in an asset catalog, which in turn specifies asset metadata describing a given asset (e.g., a text document, multimedia, a presentation deck, an audio book or podcast, or any other forms of digital learning materials) known to or catalogued by the insight service, and relevant to the learning topic (and, optionally, the learning context(s)) (received via the learning query in Step 300).

Further, in one or many embodiment(s) disclosed herein, the learning path may represent a directed path, or any path encompassing one or more edges each having a direction and, thus, each connecting one node (e.g., the path-starting node or a path-body node) to another node (e.g., a path-body node or the path-ending node) via said direction. Also, in traversing the learning path from the path-starting node to the path-ending node, each learning path node is visited, while each learning path edge between a pair of learning path nodes is crossed, only once. Accordingly, each learning path edge in/of the learning path may be oriented towards the same direction.

In one or many embodiment(s) disclosed herein, determination of the learning path may rely on any combination of the super node(s), most connected node(s) within one or more metadata subgraphs, and/or the other node(s) (identified in Step 314), as well as the edge weight(s) (set/adjusted in Step 312). For example, a learning path maybe as simple as the entire path that connects the super nodes. Alternatively, the learning path may be as complex as identifying the assets that are deemed the most impactful within the subgraph or context in which the inquiry originated. To determine the most impactful asset embodiment may utilize metadata, such as, other views and visits, ratings, forward and backward citations, impact of authors and network power they poses within the specific domain(s). Utilizing this metadata as a weight that is assigned to these assets in combination with a ranking algorithm, such as, a simple page rank, a learning path that includes a start node and 'n' next steps for the user to take may be determined. Further, in various embodiments, the learning path may not be static; rather depending on the selection of the next step(s) by the user, the weights associated with the next steps may change. This may result in an updated learning path, e.g., based on the user's selection the system may recommend learning paths that are more in depth or recommend more complex assets to view. Additionally, or alternatively, the system may recommend that the user move into a new domain or subdomain that was identified or mentioned within the previous assets. In this manner, based on selection and the business intent, the learning paths maybe re-evaluated after each interaction with the assets. For certain domains or subdomains the impact analysis and weights can be predetermined due to other relationship information that is known, which may result in the start and the end nodes to become almost static.

In one or many embodiment(s) disclosed herein, the sequence in which the learning path nodes may be ordered may reflect a spectrum of assets (e.g., learning materials) teaching progressively more difficult or more advanced aspects of the learning topic (and, optionally, the learning context(s)) (received via the learning query in Step 300). For example, the path-starting node in/of the learning path may correspond to an asset commensurate to a novice/basic knowledge level or, alternatively, a standing/current knowledge level that the organization user may retain, concerning the learning topic (and, optionally, the learning context(s)). On the other hand, the path-ending node in/of the learning path may correspond to another asset representative of a mastery knowledge level concerning the learning topic (and, optionally, the learning context(s)). Any path-body node(s) there-between may each correspond to, or introduce, yet another asset that may serve to progressively advance the proficiency, of/by the organization user, in terms of the learning topic (and, optionally, the learning context(s)).

Turning to FIG. 4B, in Step 318, a set of learning path nodes is/are identified. In one or many embodiment(s) disclosed herein, and as re-iterated from above, the set of learning path nodes may include one or more nodes that, at least in part, form and, therefore, is/are positioned along, the learning path (determined in Step 316).

In Step 320, for each learning path node in the set of learning path nodes (identified in Step 318), at least a portion of asset metadata, for an asset (e.g., a text document, multimedia, a presentation deck, an audio book or podcast, or any other forms of digital learning materials) corresponding to the learning path node, is extracted. In one or many embodiment(s) disclosed herein, the extracted portion of asset metadata may include, but is not limited to, stewardship (or ownership) information and compliance information (both briefly defined above—see e.g., Step 404) associated with the asset.

In Step 322, the user access permissions (obtained in Step 302), associated with the organization user, is assessed against the compliance information (extracted in Step 320) associated with one or more assets. In one or many embodiment(s) disclosed herein, the asset(s) may map to asset catalog entry/entries represented by the set of learning path nodes (identified in Step 310).

Further, assessment of the user access permissions, against the asset compliance information, may, for example, entail determining: whether a geographical location of the organization user is within the geographical restrictions or boundaries, at least in part, defining access to an asset; whether the organization, with which the organization user is associated, is of a particular type (e.g., a commercial business, an educational institution, etc.) to which access and usability of an asset is granted; and whether one or more organization roles (e.g., title(s) and/or position(s)) and/or professional affiliation(s) (e.g., membership(s) to professional organization(s)), with which the organization user is associated, satisfies criteria for permitting access to an asset.

Moreover, the above-mentioned assessment, between the user access permissions and the asset compliance information, may result in producing access remarks that concern the asset(s) associated with the extracted compliance information. In one or many embodiment(s) disclosed herein, any access remarks may refer to information expressing whether the asset(s) is/are accessible or inaccessible to/by the organization user. Said information (for any given asset) may include, but is not limited to: an accessibility statement indicating that the given asset can or cannot be accessed by the organization user; one or more reasons explaining or supporting the accessibility statement; a digital reference link (e.g., uniform resource locator or hyperlink) or an access protocol through which the organization user can access the given asset should the accessibility statement indicate that the given asset can be accessed by the organization user; and/or the stewardship information (extracted in Step 320) associated with the given asset should the accessibility statement alternatively indicate that the given asset cannot be accessed by the organization user.

In one or many embodiment(s) disclosed herein, stewardship information may be integrated, as part of the access remarks for a given asset (if applicable—e.g., if the given asset is deemed inaccessible), in order to provide the organization user with an opportunity to potentially gain access to the given asset through communications with the steward(s) or owner(s) of the given asset. The potential to gain access to the given asset through this avenue, however, may be moot or disregarded in view of other, higher-tiered compliance policies such as those outlined by geographical restrictions, as well as national and/or international laws, regulations, and standards.

In Step 324, an asset availability, for each of one or more assets (e.g., one or more documents, multimedia, presentation decks, audio books or podcasts, or any other forms of digital learning materials), is determined. In one or many embodiment(s) disclosed herein, the asset(s) may map to asset catalog entry/entries represented by the set of learning path nodes (identified in Step 310). Further, the determination of asset availability for any given asset may, for example, entail the submission of an asset availability query to an appropriate (i.e., internal or external) data source identified in the asset metadata describing the given asset. Any asset availability query may include or specify an asset identifier (also found in the asset metadata) that uniquely identifies the given asset. Moreover, in response to any asset availability query, a corresponding asset availability reply may be received, which may include or specify an asset availability state indicating whether the given asset is available (e.g., obtainable, usable, or reachable) or unavailable (e.g., unobtainable, unusable, or unreachable). Thereafter, the returned asset availability state(s) for the asset(s), respectively, may be used to produce availability remarks concerning the asset(s). Any availability remarks may refer to information expressing whether the asset(s) is/are available or unavailable at/on one or more data sources that the asset(s) currently reside, or at one time, had resided.

In Step 326, a learning curriculum is created. In one or many embodiment(s) disclosed herein, the learning curriculum may refer to an ordered itemization/listing (or sequenced itemization/listing) (also referred to herein as a manifest) of learning materials and/or content that progressively teaches improved proficiency in the learning topic (and, optionally, the learning context(s)) (received via the learning query in Step 300). The learning curriculum, further, may be tailored to, and therefore may align with the user talent information and/or the user learning preferences (obtained in Step 302) of, the organization user. Other information, moreover, may also be enclosed within or may accompany the learning curriculum. Said other information may include, but is not limited to, the access remarks (produced in Step 322) and the availability remarks (produced in Step 324).

In Step 328, the learning curriculum (created in Step 326) is provided in response to the learning query (received in Step 300). Particularly, in one or many embodiment(s) disclosed herein, the learning curriculum may be provided to the organization user who had submitted the learning query.

In Step 330, learning curriculum feedback is received. In one or many embodiment(s) disclosed herein, the learning curriculum feedback may speak to the effectiveness of the learning curriculum (provided in Step 328) in progressively improving the organization user proficiency surrounding the learning topic (and, optionally, the learning context(s)) (received via the learning query in Step 300). Examples of learning curriculum feedback may include, but are not limited to: measurement(s) and/or metric(s) (e.g., time to consume (i.e., read, listen to, watch) the learning material(s), etc.) reflecting organization user engagement with learning curriculum (or the asset(s)—e.g., one or more text documents, multimedia, presentation decks, audio books or podcasts, or any other forms of digital learning materials—listed therein); a user review rating (via any rating scale—e.g., 1-5 stars, etc.) indicating an efficacy of the learning curriculum experienced by the organization user; and a post-learning survey, directed to the organization user, that may inquire, for example, whether the learning curriculum, at least in part, aided in achieving any organizational (or business) goals.

In Step 332, the learning curriculum (provided in Step 328), or the process of learning curriculum generation in general, is adjusted based on the learning curriculum feedback (received in Step 330). In one or many embodiment(s) disclosed herein, adjustment of the learning curriculum (or of the generation of learning curriculums generally) may, for example, entail understanding metrics, ratings, comments, acknowledgements, mentions, referrals, etc. to understand if the reader know has an expected understanding of the domain or subdomain. If this knowledge is deemed enough for their business intent then the next assets can be accessed or recommended. If the business intent requires more detailed knowledge then the more complexity ranked, and impactful assets are recommended. This continues until the desired level of knowledge and understanding is achieved.

Figure 4:
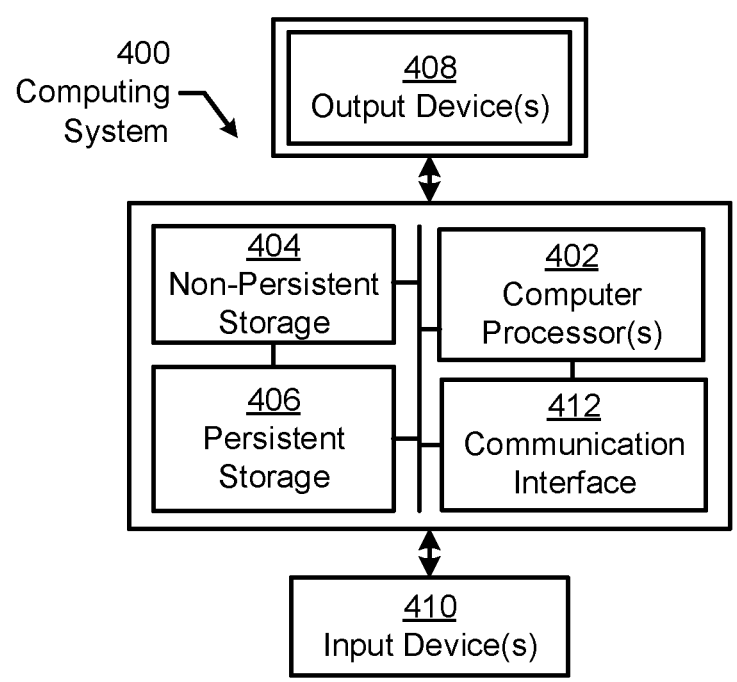
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

FIGS. 5A-5I show an example scenario in accordance with one or more embodiments disclosed herein. The example scenario, illustrated through FIGS. 5A-5I and described below, is explanatory purposes only and not intended to limit the scope disclosed herein.

Hereinafter, consider the following example scenario whereby an organization user, identified as Ed, seeks to gain subject matter proficiency in the artificial intelligence (AI) space in anticipation of a prospective meeting with a customer that specializes in the streamlining of widget manufacturing using AI. To that end, Ed relies on the disclosed capability of metadata-based learning curriculum generation by the insight service to fulfill their business goals. Interactions amongst various actors—e.g., a Client Device (500) operated by Ed, the Insight Service (502), and three separate data sources (i.e., Data Source A (504A), Data Source B (504B), and Data Source C (504C))—are illustrated in conjunction with components shown across FIGS. 5A-5I and described (in an itemized manner) below. Said interactions, as well as processes performed on/by any particular actor may follow embodiments disclosed herein pertaining to metadata-based learning curriculum generation as applied to the circumstances of the example scenario.

Figure 5A:
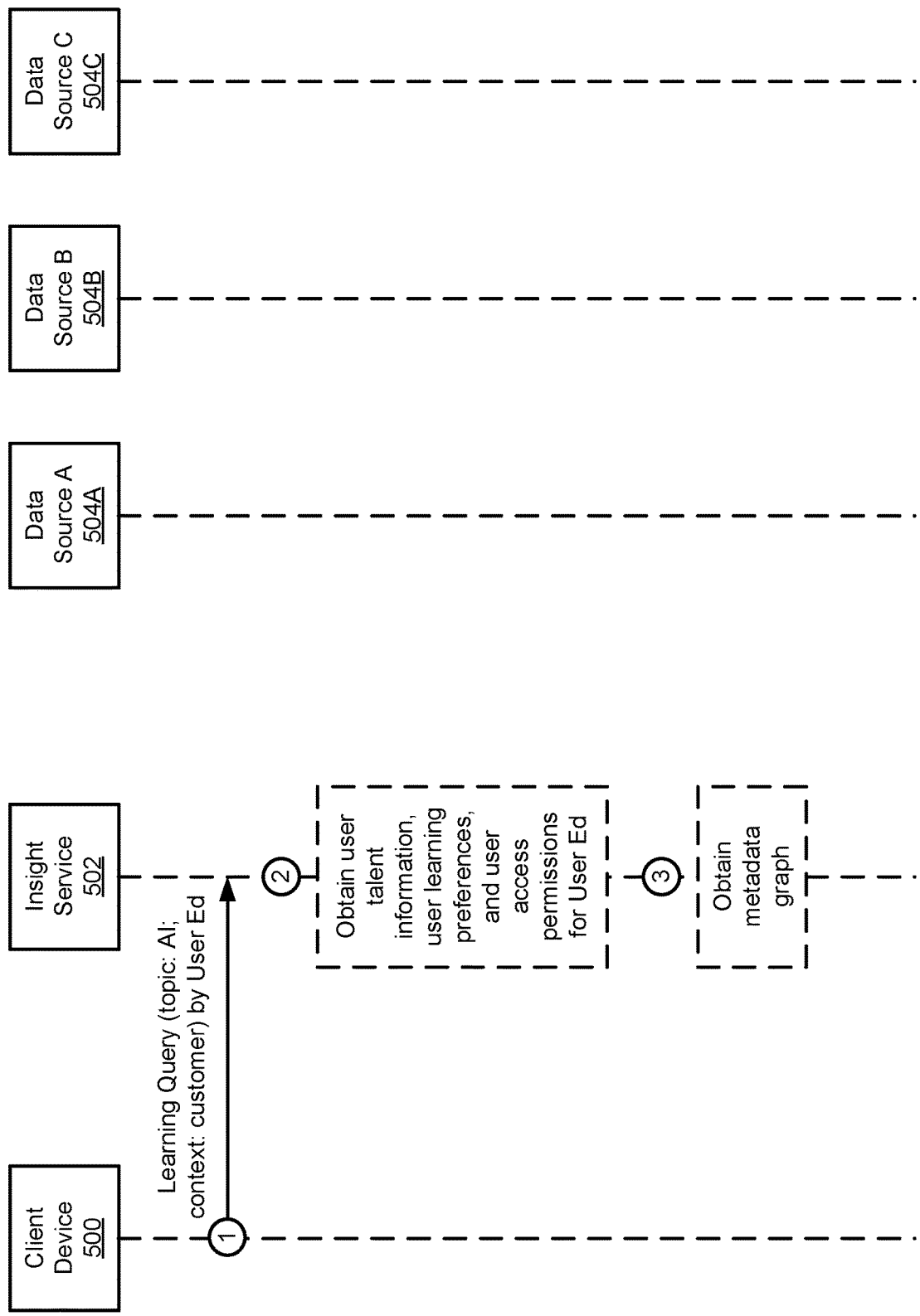
FIGS. 5A-5I show an example scenario in accordance with one or more embodiments disclosed herein.
Figure 5B:
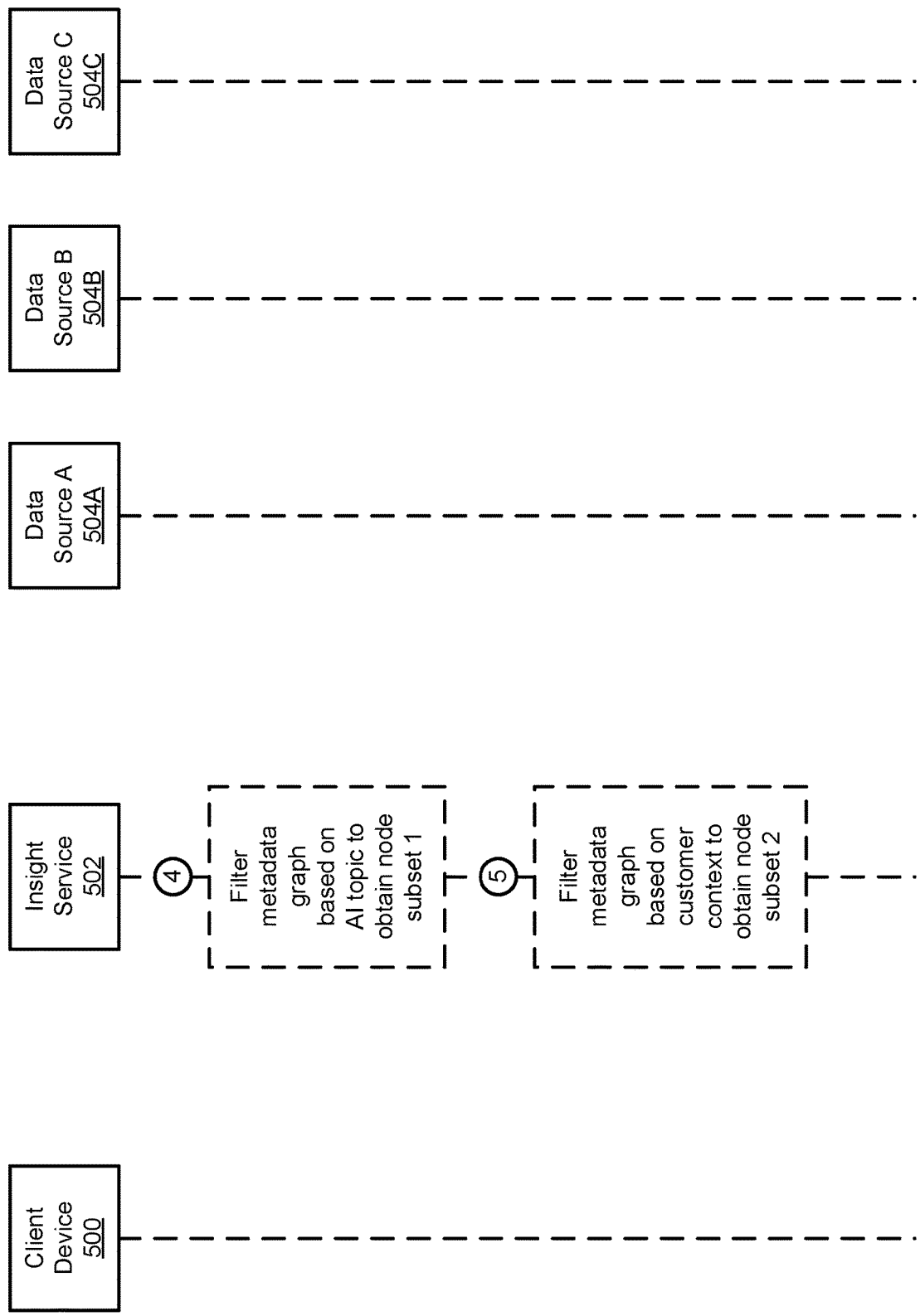
Figure 5C:
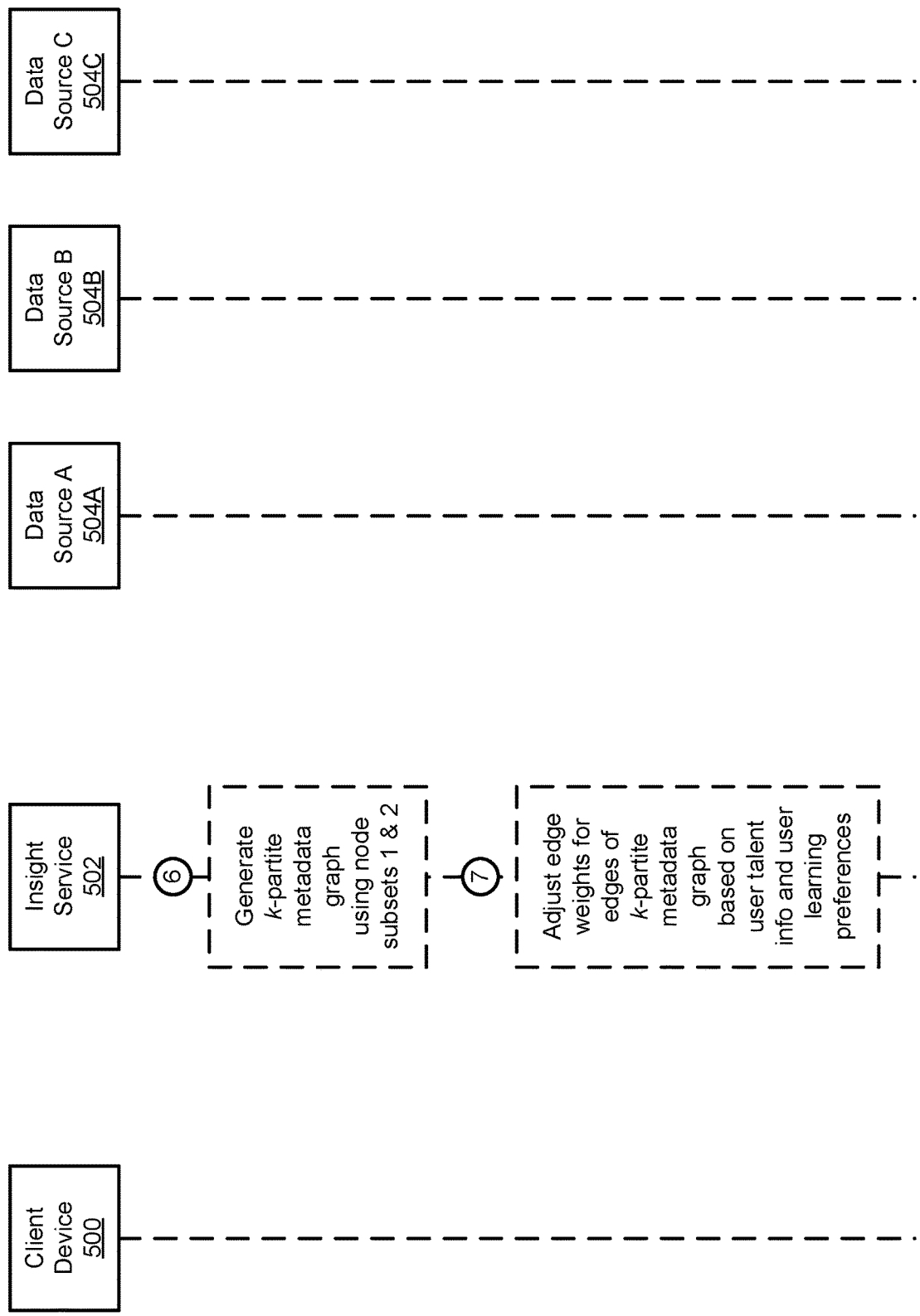
Figure 5D:
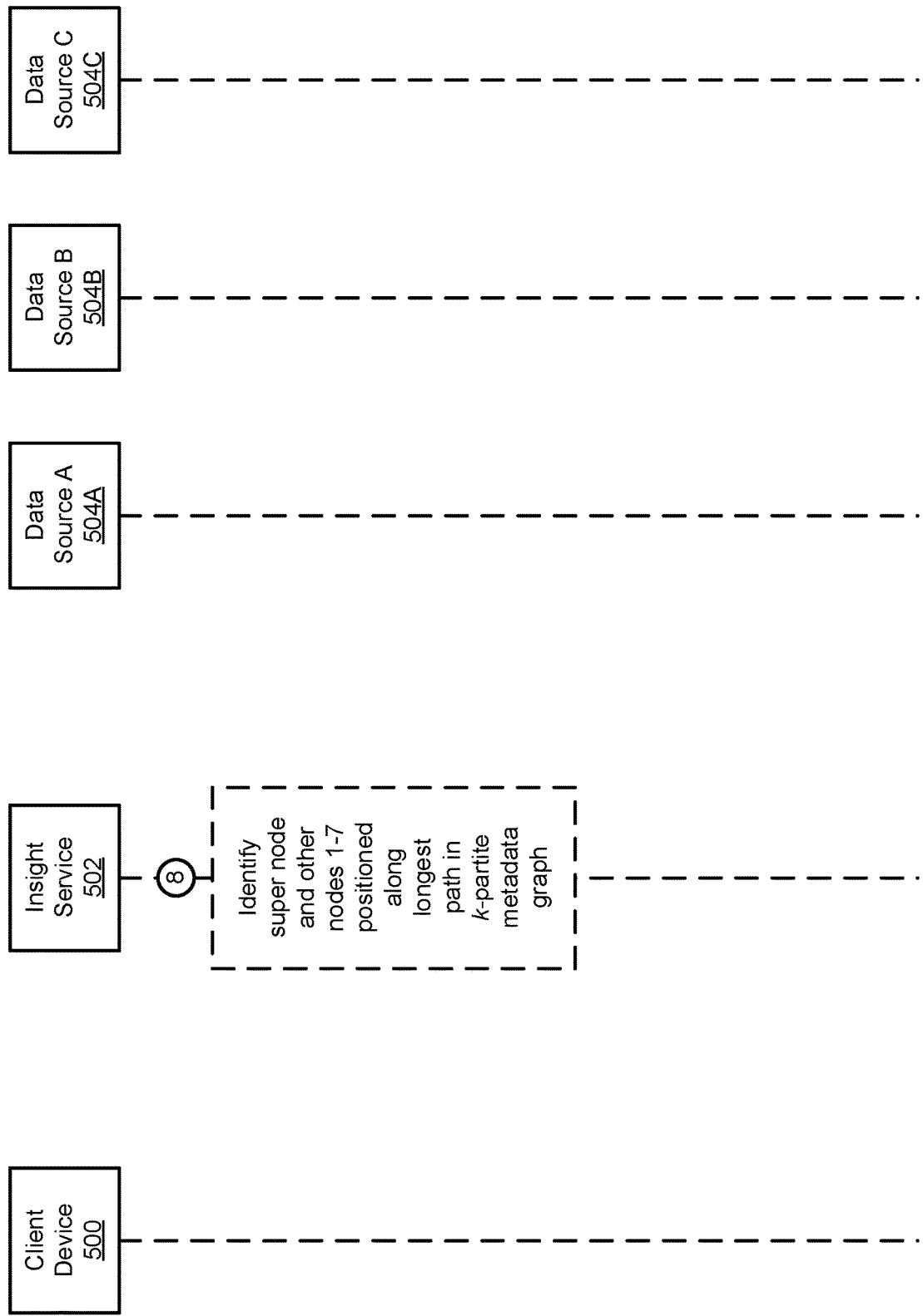
Figure 5E:
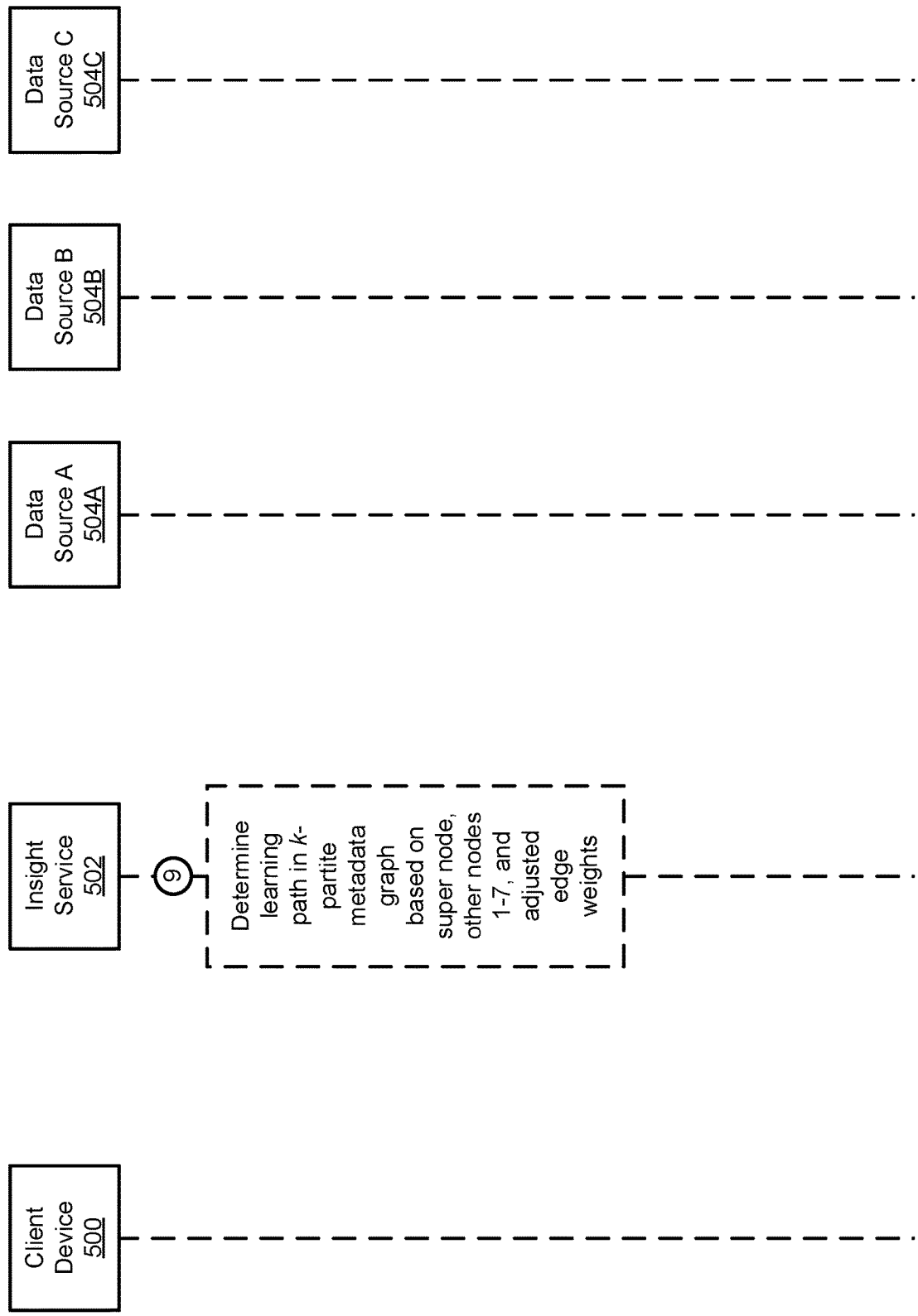
Figure 5F:
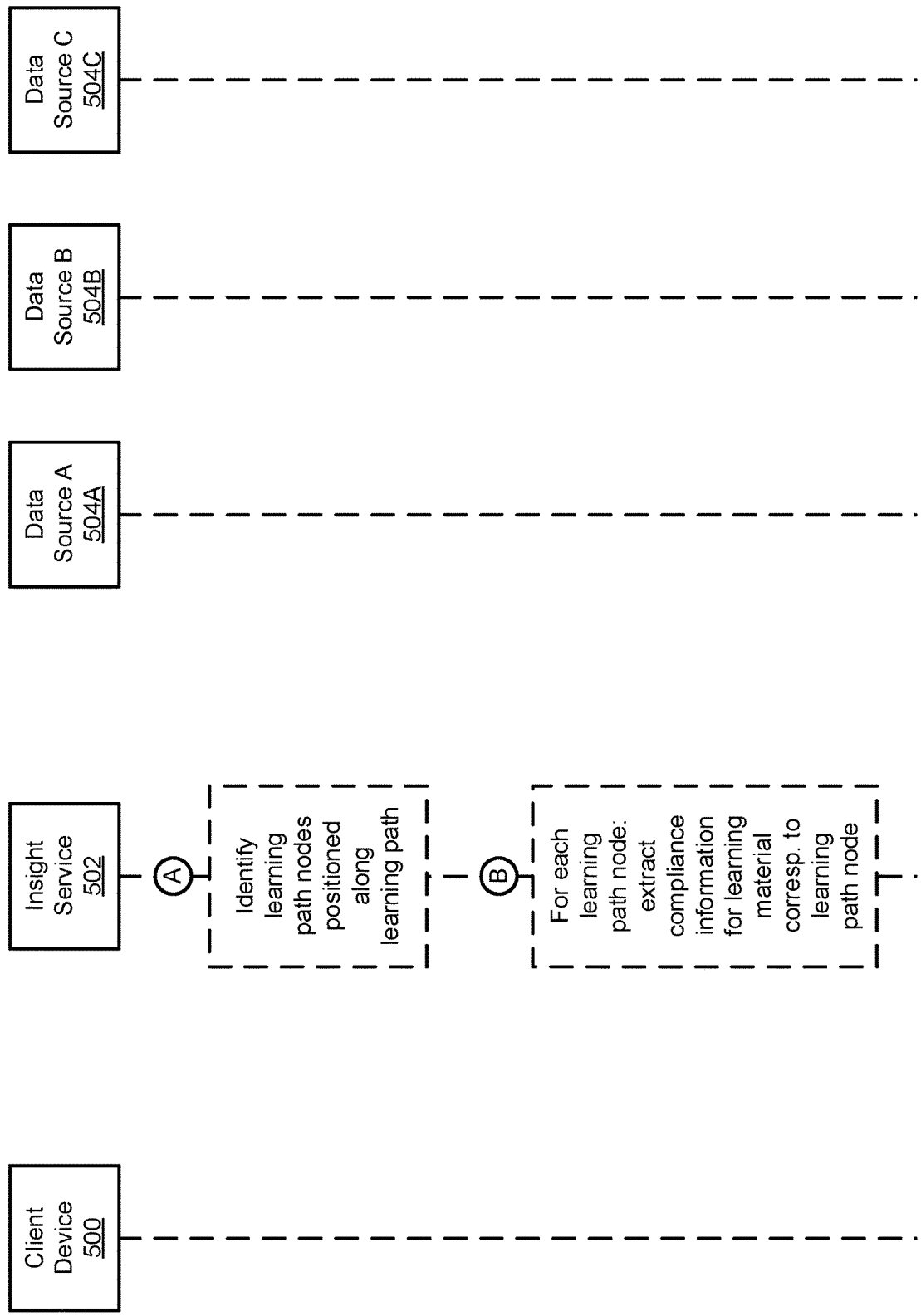
Figure 5G:
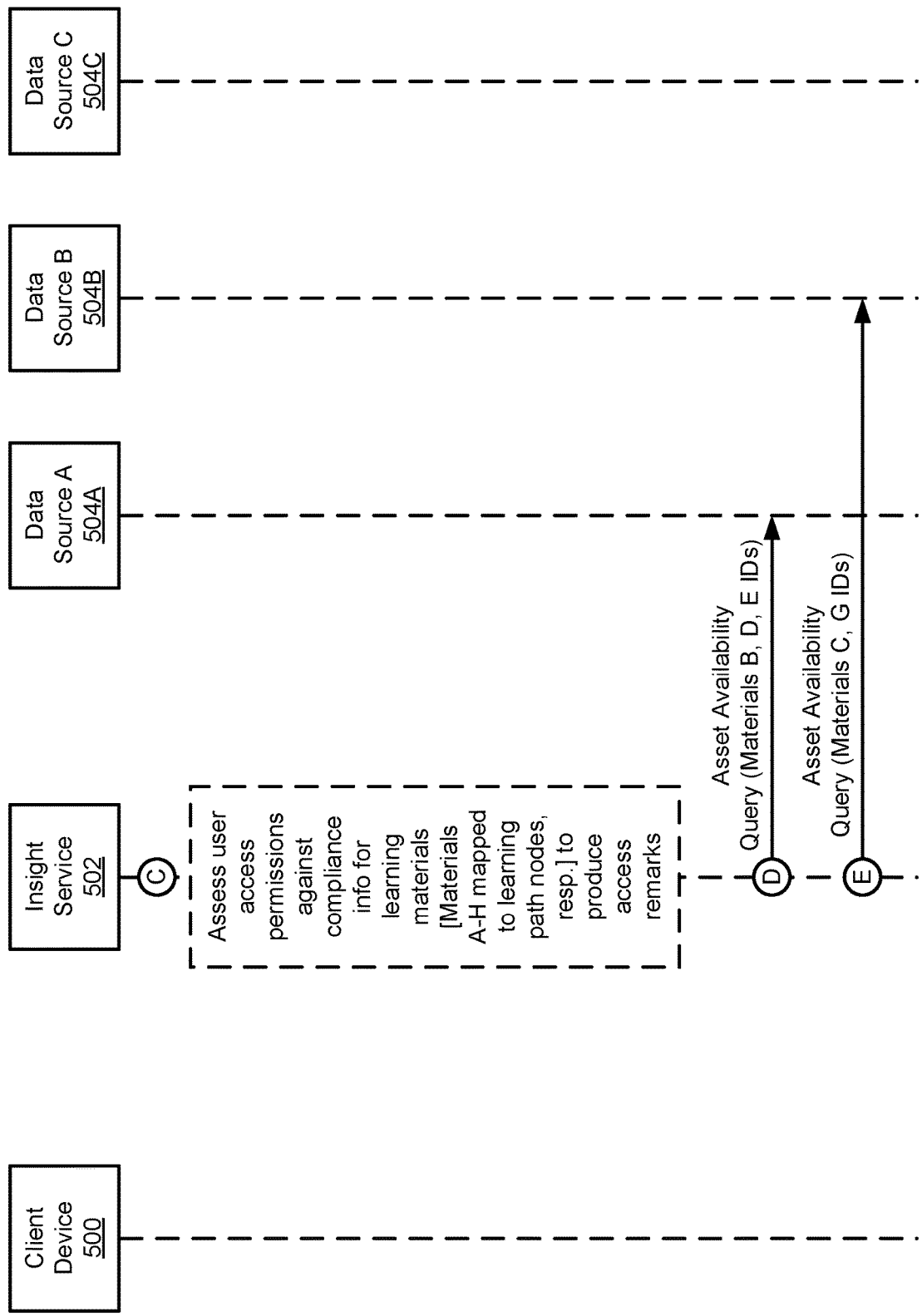
Figure 5H:
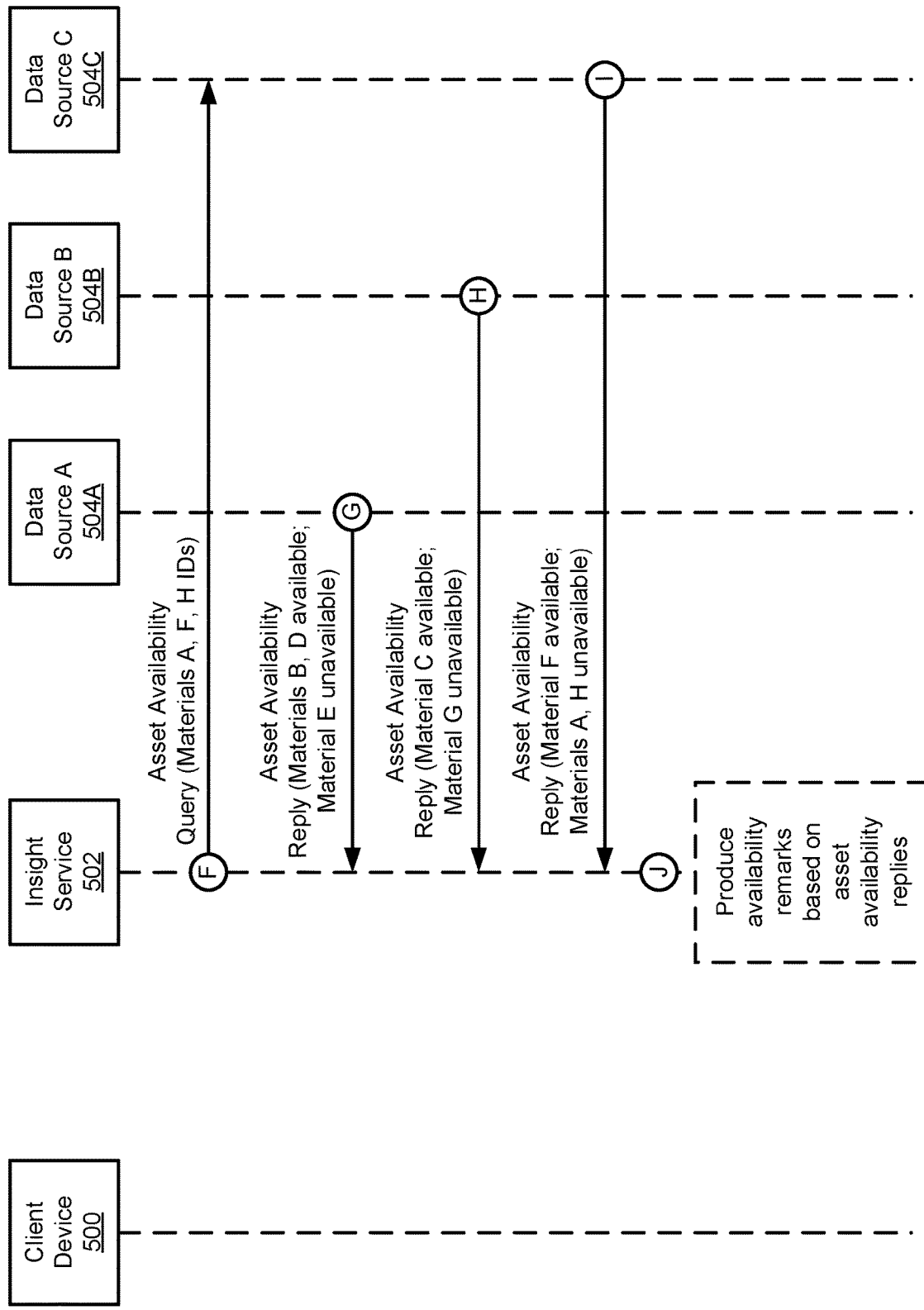
Figure 5I:
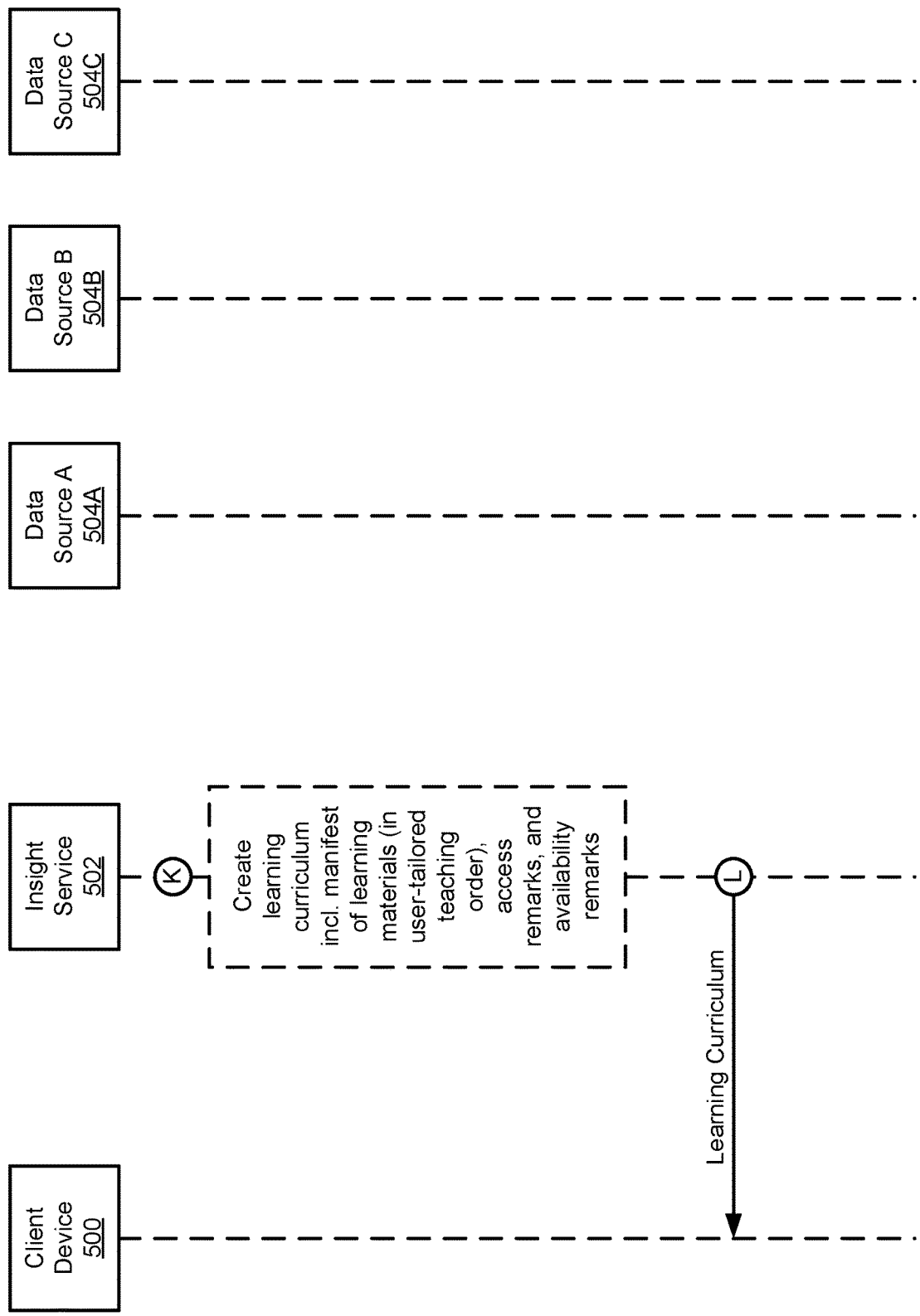

Turning to FIG. 5A:

1. User Ed, operating the Client Device (500), submits a learning query to the Insight Service (502), where the learning query specifies AI as a learning topic and the customer as a learning context
2. The Insight Service (502) obtains a user profile for User Ed, where the user profile includes user talent information, user learning preferences, and user access permissions associated with User Ed
3. The Insight Service (502) further obtains a metadata graph representative of an asset catalog Turning to FIG. 5B:

4. Based on the learning topic of AI, the Insight Service (502) filters the metadata graph to identify node subset 1 of a set of nodes, at least in part, forming the metadata graph, where node subset 1 includes one or more nodes corresponding to asset catalog entry/entries each specifying asset metadata (or at least a portion thereof) matching the learning topic of AI 5. Based on the learning context of the customer, the Insight Service (502) filters the metadata graph to identify node subset 2 of the set of nodes, at least in part, forming the metadata graph, where node subset 2 includes one or more nodes corresponding to asset catalog entry/entries each specifying asset metadata (or at least a portion thereof) matching the learning context of the customer Turning to FIG. 5C:

6. The Insight Service (502) generates a k-partite (i.e., bi-partite) metadata graph using node subsets 1 & 2
7. The Insight Service (502) sets/adjusts an edge weight for an edge subset of a set of edges, at least in part, forming the k-partite metadata graph based on the user talent information and/or the user learning preferences, where the edge subset includes one or more edges each corresponding to a relationship between a pair of asset catalog entries, where a first asset catalog entry of the pair of asset catalog entries specifies asset metadata (or at least a portion thereof) matching the learning topic of AI while a second asset catalog entry of the pair of asset catalog entries specifies asset metadata (or at least a portion thereof) matching the learning context of the customer, where the edge weight for any given edge in the edge subset quantifies a relationship strength of the relationship to which the given edge corresponds Turning to FIG. 5D:

8. The Insight Service (502) identifies a super node, as well as other nodes 1-7 (each satisfying an identification criterion of being positioned along a longest path), in/of the k-partite metadata graph Turning to FIG. 5E:

9. Based on the super node, other nodes 1-7, and the set/adjusted edge weight(s) for the edge subset, the Insight Service (502) determines a learning path that traverses at least a portion of the k-partite metadata graph Turning to FIG. 5F:

A. The Insight Service (502) identifies a set of learning path nodes positioned along the learning path
B. The Insight Service (502) extracts a portion of asset metadata from asset catalog entries corresponding to each learning path node in the set of learning path nodes, where the portion of asset metadata includes stewardship information and compliance information associated with assets (e.g., text document(s), multimedia, presentation deck(s), audio book(s) or podcast (s), or any other forms of digital learning materials) to which the extracted portion of asset metadata belongs Turning to FIG. 5G:

C. The Insight Service (502) assesses the user access permissions (associated with User Ed) against the compliance information for the assets (e.g., learning materials A-H) mapped respectively to the set of learning path nodes, where the assessment leads to the production of access remarks (e.g., learning materials A, C-F, & H are deemed accessible, whereas learning materials B & G are deemed inaccessible, to/by User Ed; further, stewardship information associated with learning materials B & G is incorporated) concerning the assets
D. To ascertain an asset availability for each of learning materials B, D, & E, the Insight Service (502) submits an asset availability query to Data Source A (504A) which is identified as the host of learning materials B, D, & E amongst the asset metadata thereof, where the asset availability query includes unique asset identifiers (learning materials B, D, & E IDs) associated respectively with learning materials B, D, & E
E. To ascertain an asset availability for each of learning materials C & G, the Insight Service (502) submits an asset availability query to Data Source B (504B) which is identified as the host of learning materials C & G amongst the asset metadata thereof, where the asset availability query includes unique asset identifiers (learning materials C & G IDs) associated respectively with learning materials C & G Turning to FIG. 5H:

F. To ascertain an asset availability for each of learning materials A, F, & H, the Insight Service (502) submits an asset availability query to Data Source C (504C) which is identified as the host of learning materials A, F, & H amongst the asset metadata thereof, where the asset availability query includes unique asset identifiers (learning materials A, F, & H IDs) associated respectively with learning materials A, F, & H
G. In response to the submitted asset availability query regarding learning materials B, D, & E, Data Source A (504A) returns an asset availability reply to the Insight Service (502), where the asset availability reply specifies asset availability states indicating that learning materials B & D are available while learning material E is unavailable
H. In response to the submitted asset availability query regarding learning materials C & G, Data Source B (504B) returns an asset availability reply to the Insight Service (502), where the asset availability reply specifies asset availability states indicating that learning material C is available while learning material G is unavailable
I. In response to the submitted asset availability query regarding learning materials A, F, & H, Data Source C (504C) returns an asset availability reply to the Insight Service (502), where the asset availability reply specifies asset availability states indicating that learning material F is available while learning materials A & H are unavailable
J. The Insight Service (502) produces availability remarks concerning learning materials A-H based on the returned asset availability replies Turning to FIG. 5I:

K. The Insight Service (502) creates a learning curriculum including a manifest listing learning materials A-H (in a progressive learning order tailored for User Ed), as well as the produced access and availability remarks
L. In response to the submitted learning query, the Insight Service (502) provides the created learning curriculum to the Client Device (500) or, more specifically, to User Ed While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for creating learning curriculums, the method comprising:
   receiving a learning query comprising a learning topic;
   obtaining a metadata graph representative of an asset catalog;
   filtering, based on the learning topic, the metadata graph to identify a node subset;
   generating a k-partite metadata graph using the node subset; and
   creating a learning curriculum based on the k-partite metadata graph, wherein creating the learning curriculum based on the k-partite metadata graph, comprises:
      identifying a super node in the k-partite metadata graph;
      determining, based on the super node, a learning path traversing at least a portion of the k-partite metadata graph;
      identifying a set of learning path nodes positioned along the learning path;
      creating the learning curriculum comprising a manifest of assets listing a set of assets corresponding, respectively, to the set of learning path nodes;
      prior to determining the learning path:
         identifying a metadata subgraph within the k-partite metadata graph;
         identifying a most connected node of the metadata subgraph, wherein the learning path is determined further based on the most connected node of the metadata subgraph; and
         identifying, in the k-partite metadata graph, another node that satisfies an identification criterion, wherein the learning path is determined further based on the other node.

2. The method of claim 1, wherein the identification criterion is one selected from a group of criterions comprising a first node positioned along a longest path traversing the k-partite metadata graph and a second node positioned along a shortest path traversing the k-partite metadata graph.

3. The method of claim 1, wherein creating the learning curriculum based on the k-partite metadata graph, further comprises:
   prior to determining the learning path:
      adjusting an edge weight associated with at least one edge in the k-partite metadata graph to obtain at least one adjusted edge weight,
   wherein the learning path is determined further based on the at least one adjusted edge weight.

4. The method of claim 3, the method further comprising:
   prior to obtaining the metadata graph:
      obtaining a user profile for an organization user,
      wherein the learning query originates from the organization user and the user profile comprises user talent information and user learning preferences both associated with the organization user, and
      wherein the edge weight is adjusted based on at least one selected from a group of user profile components comprising the user talent information and the user learning preferences.

5. The method of claim 4, the method further comprising:
   after creating the learning curriculum:
      providing, in response to the learning query, the learning curriculum to the organization user;
      receiving, from the organization user, learning curriculum feedback concerning the learning curriculum; and
      adjusting learning curriculum generation based on the learning curriculum feedback.

6. The method of claim 1, wherein creating the learning curriculum based on the k-partite metadata graph, further comprises:
   prior to creating the learning curriculum:
      for each learning path node in the set of learning path nodes, and to obtain the set of assets and a set of asset availabilities respective to the set of assets:
         extracting asset metadata from an asset catalog entry of the asset catalog,
            wherein the asset metadata describes an asset in the set of assets and the asset catalog entry corresponds to the learning path node; and
         determining, for the asset, an asset availability in the set of asset availabilities; and
      producing availability remarks comprising the set of asset availabilities, wherein the learning curriculum further comprises the availability remarks.

7. The method of claim 6, the method further comprising:
   prior to obtaining the metadata graph:
      obtaining a user profile for an organization user,
      wherein the learning query originates from the organization user and the user profile comprises user access permissions associated with the organization user, and
   wherein creating the learning curriculum based on the k-partite metadata graph, further comprises:
      prior to creating the learning curriculum:
         for each learning path node in the set of learning path nodes, and to complete a set of assessments respective to the set of assets:
            performing an assessment, in the set of assessments, of the user access permissions against compliance information associated with the asset,
               wherein the asset metadata comprises the compliance information; and
         producing access remarks based on the set of assessments,
            wherein the learning curriculum further comprises the access remarks.

8. The method of claim 7, wherein one assessment, in the set of assessments, results in one asset being deemed inaccessible to the organization user, wherein the asset metadata further comprises stewardship information associated with the one asset, and wherein the access remarks at least concerning the one asset comprises an accessibility statement indicating that the one asset is inaccessible to the organization user, at least one reason supporting the accessibility statement, and the stewardship information.

9. The method of claim 1, wherein each asset in the set of assets is a learning material with relevance to gaining proficiency in the learning topic.

10. The method of claim 1, wherein the learning query further comprises at least one learning context.

11. The method of claim 10, the method further comprising:
    prior to generating the k-partite metadata graph:
       filtering, based on the at least one learning context, the metadata graph to identify at least one second node subset,
       wherein generation of the k-partite metadata graph further uses the at least one second node subset.

12. A non-transitory computer readable medium (CRM) comprising computer readable program code, which when executed by a computer processor, enables the computer processor to perform a method for creating learning curriculums, the method comprising:

receiving a learning query comprising a learning topic;

obtaining a metadata graph representative of an asset catalog;

filtering, based on the learning topic, the metadata graph to identify a node subset;

generating a k-partite metadata graph using the node subset; and creating a learning curriculum based on the k-partite metadata graph, wherein creating the learning curriculum based on the k-partite metadata graph, comprises:

identifying a super node in the k-partite metadata graph;

determining, based on the super node, a learning path traversing at least a portion of the k-partite metadata graph;

identifying a set of learning path nodes positioned along the learning path;

creating the learning curriculum comprising a manifest of assets listing a set of assets corresponding, respectively, to the set of learning path nodes;

prior to determining the learning path:

identifying a metadata subgraph within the k-partite metadata graph;

identifying a most connected node of the metadata subgraph, wherein the learning path is determined further based on the most connected node of the metadata subgraph; and identifying, in the k-partite metadata graph, another node that satisfies an identification criterion, wherein the learning path is determined further based on the other node.

13. The non-transitory CRM of claim 12, wherein creating the learning curriculum based on the k-partite metadata graph, further comprises:

prior to determining the learning path:

adjusting an edge weight associated with at least one edge in the k-partite metadata graph to obtain at least one adjusted edge weight, wherein the learning path is determined further based on the at least one adjusted edge weight.

14. A system, the system comprising:

a client device; and an insight service operatively connected to the client device, and comprising a computer processor configured to perform a method for creating learning curriculums, the method comprising:

receiving, from the client device, a learning query comprising a learning topic;

obtaining a metadata graph representative of an asset catalog;

filtering, based on the learning topic, the metadata graph to identify a node subset;

generating a k-partite metadata graph using the node subset; and creating a learning curriculum based on the k-partite metadata graph, wherein creating the learning curriculum based on the k-partite metadata graph, comprises:

identifying a super node in the k-partite metadata graph;

determining, based on the super node, a learning path traversing at least a portion of the k-partite metadata graph;

identifying a set of learning path nodes positioned along the learning path;

creating the learning curriculum comprising a manifest of assets listing a set of assets corresponding, respectively, to the set of learning path nodes;

prior to determining the learning path:

identifying a metadata subgraph within the k-partite metadata graph;

identifying a most connected node of the metadata subgraph, wherein the learning path is determined further based on the most connected node of the metadata subgraph; and identifying, in the k-partite metadata graph, another node that satisfies an identification criterion, wherein the learning path is determined further based on the other node.

* * * * *